United States Patent
Grayson et al.

(10) Patent No.: US 11,523,305 B2
(45) Date of Patent: Dec. 6, 2022

(54) TRAFFIC STEERING AND POLICY COMBINING

(71) Applicant: Cisco Technology, Inc., San Jose, CA (US)

(72) Inventors: Mark Grayson, Berkshire (GB); Louis Gwyn Samuel, Wiltshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/791,494

(22) Filed: Feb. 14, 2020

(65) Prior Publication Data

US 2021/0092645 A1 Mar. 25, 2021

Related U.S. Application Data

(60) Provisional application No. 62/905,577, filed on Sep. 25, 2019.

(51) Int. Cl.
*H04W 28/06* (2009.01)
*H04W 28/18* (2009.01)
*H04W 76/15* (2018.01)

(52) U.S. Cl.
CPC ........... *H04W 28/18* (2013.01); *H04W 76/15* (2018.02)

(58) Field of Classification Search
CPC ..... H04W 76/15; H04W 28/18; H04W 28/08; H04W 76/27; H04W 80/10
See application file for complete search history.

(56) References Cited

U.S. PATENT DOCUMENTS

| 9,860,812 B2 | 1/2018 | Tipton et al. |
| 10,075,343 B2 | 9/2018 | Burk et al. |
| 11,063,785 B2 | 7/2021 | Milescu et al. |

(Continued)

FOREIGN PATENT DOCUMENTS

| EP | 2953398 B1 | 6/2018 |
| WO | 2019/197016 A1 | 10/2019 |
| WO | 2021045859 A1 | 3/2021 |

OTHER PUBLICATIONS

3GPP, "3rd Generation Partnership Project; Technical Specification Group Core Network and Terminals Representational State Transfer (REST) reference point between Application Function (AF) and Protocol Converter (PC) (Release 15)", 3GPP TS 29.201 V15.0.0 (Sep. 2017), 36 pages.

(Continued)

*Primary Examiner* — Syed Ali
(74) *Attorney, Agent, or Firm* — Edell, Shapiro & Finnan, LLC

(57) ABSTRACT

Techniques are described to provide traffic steering and policy combining in a mobile network. In one example, a method includes combining, by a policy function of a network, a user equipment (UE) access policy comprising UE access rules obtained from a UE with a network-based access policy associated with the network to generate a combined access policy, the combined access policy comprising combined access rules; communicating the combined access rules to the UE via a message, wherein the message comprises an indication that indicates that the UE is not allowed to override the combined access rules with the UE access rules; and communicating the combined access rules to a user plane function handling traffic for the UE.

20 Claims, 8 Drawing Sheets

(56) References Cited

U.S. PATENT DOCUMENTS

| | | | |
|---|---|---|---|
| 11,178,725 B2* | 11/2021 | Talebi Fard | H04W 28/08 |
| 2002/0122422 A1 | 9/2002 | Kenney et al. | |
| 2008/0225722 A1 | 9/2008 | Khemani et al. | |
| 2008/0301332 A1 | 12/2008 | Butler et al. | |
| 2013/0111038 A1 | 5/2013 | Girard | |
| 2013/0176908 A1* | 7/2013 | Baniel | H04L 12/1407 |
| | | | 370/259 |
| 2014/0089500 A1 | 3/2014 | Sankar et al. | |
| 2014/0161055 A1 | 6/2014 | Chitrapu et al. | |
| 2014/0226469 A1 | 8/2014 | Stewart | |
| 2015/0327114 A1 | 11/2015 | Gupta et al. | |
| 2016/0095017 A1* | 3/2016 | Ely | H04W 16/14 |
| | | | 455/454 |
| 2016/0112239 A1 | 4/2016 | Kanugovi et al. | |
| 2016/0164825 A1 | 6/2016 | Riedel et al. | |
| 2016/0164826 A1 | 6/2016 | Riedel et al. | |
| 2016/0191635 A1 | 6/2016 | Greenan et al. | |
| 2016/0359673 A1 | 12/2016 | Gupta et al. | |
| 2016/0360464 A1 | 12/2016 | Han et al. | |
| 2017/0118687 A1 | 4/2017 | Tipton et al. | |
| 2017/0311197 A1 | 10/2017 | Lopes et al. | |
| 2018/0097725 A1 | 4/2018 | Wood et al. | |
| 2019/0069194 A1 | 2/2019 | Jun et al. | |
| 2019/0182165 A1 | 6/2019 | Yang et al. | |
| 2019/0268375 A1 | 8/2019 | Gundavelli et al. | |
| 2019/0268777 A1* | 8/2019 | Simon | H04N 21/6131 |
| 2019/0274178 A1 | 9/2019 | Salkintzis et al. | |
| 2019/0306752 A1* | 10/2019 | Lai | H04W 88/06 |
| 2019/0373505 A1* | 12/2019 | Jun | H04W 80/10 |
| 2019/0394279 A1* | 12/2019 | Dao | H04W 48/04 |
| 2019/0394833 A1 | 12/2019 | Talebi Fard et al. | |
| 2021/0006491 A1 | 1/2021 | Amend et al. | |
| 2021/0007166 A1 | 1/2021 | Liao et al. | |
| 2021/0092664 A1* | 3/2021 | Lai | H04W 76/16 |
| 2021/0105660 A1* | 4/2021 | Jeong | H04W 28/0289 |
| 2021/0120596 A1 | 4/2021 | Youn et al. | |
| 2021/0135944 A1 | 5/2021 | S et al. | |

OTHER PUBLICATIONS

Ford, A. et al., "Architechtural Guidelines for Multipath TCP Development", Internet Engineering Task Force, Mar. 2011, 28 pages.

Welzl, M. et al., "A Minimal Set of Transport Services for End Systems draft-eitf-taps-minset-11", TAPS, Sep. 27, 2018, 50 pages.

Trammell, B. Ed. et al., "An Abstract Application Layer Interface to Transport Services draft-ietf-taps-interface-05", TAPS Working Group, Nov. 4, 2019, 64 pages.

Trammell, B. Ed et al., "An Abstract Application Layer Interface to Transport Services draft-ietf-taps-interface-04", TAPS Working Group, Jul. 8, 2019, 64 pages.

Brunstrom, A. Ed. et al., "Implementing Interface to Transport Services draft-ietf-taps-impl-05", TAPS Working Group, Nov. 4, 2019, 48 pages.

Pauly, T. Ed. et al., "An Architecture for Transport Services draft-ietf-taps-arch-5", TAPS Working Group, Nov. 4, 2019, 26 pages.

Pauly, T. Ed et al., "An Architecture for Transport Services draft-ietf-taps-arch-4", TAPS Working Group, Jul. 8, 2019, 25 pages.

Pauly, T. Ed. et al., "An Architecture for Transport Services draft-ietf-taps-arch-3", TAPS Working Group, Mar. 11, 2019, 25 pages.

5G Working Group, "Unlicensed Integration with 5G Networks" WBA Member, Oct. 2018, 63 pages.

Brossard, David et al., "Architecture", Axiomatics, Jul. 15, 2014, 7 pages. retrieved from Internet Aug. 13, 2019; https://www.axiomatics.com/blog/understanding-xacml-combining-algorithms/.

Ashley, Paul et al., "The Enterprise Privacy Authorization Language (EPAL)—How to Enforce Privacy throughout an Enterprise", 8 pages. retrieved from Internet Aug. 13, 2019; https://www.w3.org/2003/p3p-ws/pp/ibm3.html.

Welzl, M. et al., "On the Usage of Transport Features Provided by IETF Transport Protocols", Internet Engineering Task Force (IETF), Feb. 2018, 56 pages.

Ramli, Carroline Dewi Puspa Kencana, "Modelling and Analysing Access Control Policies in XACML 3.0", DTU Library, DTU Compute PHD-2015, No. 364, 2015, 240 pages, retrieved from Internet Aug. 13, 2019; orbit.dtu.dk.

Lochhart, Hal et al., "OASIS extensible Access Control Markup Language (XACML) TC", Oasis Open Standards. Open Sourse., 9 pages, retrieved from Internet Aug. 13, 2019; https://www.oasis-open.org/committees/tc_home.php?wg_abbrev=xacml.

Sardara, Mauro et al., "A Transport Layer and Socket API for (h)ICN: Design, Implementation and Performance Analysis", ICN '18, Sep. 21-23, 2018, Boston, MA, 11 pages.

Reeve, David C., "A New Blueprint For Network QoS", Aug. 2003, 217 pages.

3GPP, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 16)", 3GPP TS 29.274 V16.1.0 (Sep. 2019), 400 pages.

3GPP, "3rd Generation Partnership Project; Technical Specification Group Core Network and Terminals; Access Network Discovery and Selection Function (ANDSF) Management Object (MO) (Release 15)", 3GPP TS 24.312 V15.0.0 (Jun. 2018), 394 pages.

3GPP, "3rd Generation Partnership Project; Technical Specification Group Core Network and Terminals; Mobile radio interface Layer 3 specification; Core network protocols; Stage 3 (Release 16)", 3GPP TS 24.008 V16.2.0 (Sep. 2019), 793 pages.

3GPP, "3rd Generation Partnership Project; Technical Specification Group Services and System Aspects; Policy and Charging Control Framework for the 5G System; Stage 2 (Release 16)", 3GPP TS 23.503 V16.1.0 (Jun. 2019), 99 pages.

3GPP, "3rd Generation Partnership Project; Technical Specification Group Services and System Aspects; Procedures for the 5G System; Stage 2 (Release 16)", 3GPP TS 23.502 V16.1.1 (Jun. 2019), 495 pages.

3GPP, "3rd Generation Partnership Project; Technical Specification Group Services and System Aspects; System Architecture for the 5G System; Stage 2 (Release 16)", 3GPP TS 23.501 V16.1.0 (Jun. 2019), 368 pages.

Dharmadhikari, Omkar, "5G Link Aggregation with Multipath TCP (MPTCP)", Cable Labs, Apr. 3, 2019, 18 pages. retrieved from Internet Aug. 13, 2019; https://www.cablelabs.com/5g-link-aggregation-mptcp.

Li, Ninghui et al., "A Formal Language for Specifying Policy Combining Algorithms in Access Control", Tech. Rep. Sep. 2008, 25 pages.

* cited by examiner

| P1/P2 | I1 | I2 | NA | IND |
|---|---|---|---|---|
| I1 | I1 | I1 | I1 | I1 |
| I2 | I1 | I2 | I2 | I2 |
| NA | I1 | I2 | NA | IND |
| IND | I1 | I2 | IND | IND |

| P1/P2 | I1 | I2 | I1∧I2 | I1∨I2 | NA | IND |
|---|---|---|---|---|---|---|
| I1 | I1 | CF | I1 | I1 | I1 | I1 |
| I2 | CF | I2 | I2 | I2 | I2 | I2 |
| I1∧I2 | I1 | I2 | I1∧I2 | I1∨I2 | I1∧I2 | I1∧I2 |
| I1∨I2 | I1 | I2 | I1∨I2 | I1∨I2 | I1∨I2 | I1∨I2 |
| NA | I1 | I2 | I1∧I2 | I1∨I2 | NA | IND |
| IND | I1 | I2 | I1∧I2 | I1∨I2 | IND | IND |

| P1/P2 | I1 | I2 | I1∧I2 | I1∨I2 | NA | IND |
|---|---|---|---|---|---|---|
| I1 | I2 | I1 | I1 | I1 | I1 | |
| I2 | I2 | I2 | I2 | I2 | I2 | |
| I1∧I2 | I1 | I2 | I1∧I2 | I1∨I2 | I1∧I2 | I1∧I2 |
| I1∧I2 | I1 | I2 | I1∨I2 | I1∨I2 | I1∨I2 | I1∨I2 |
| NA | I1 | I2 | I1∧I2 | I1∨I2 | NA | IND |
| IND | I1 | I2 | I1∧I2 | I1∨I2 | IND | IND |

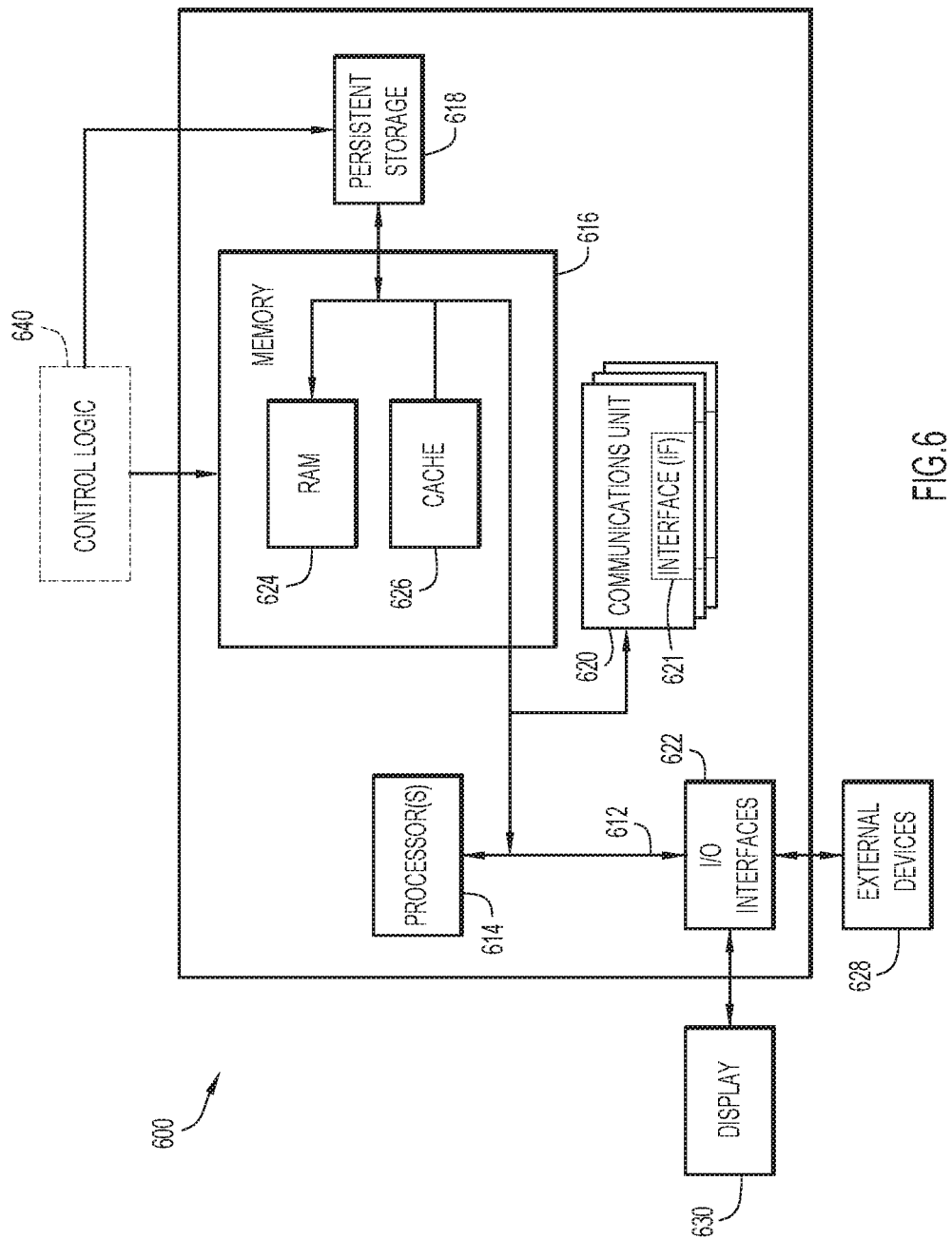

TRAFFIC STEERING AND POLICY COMBINING

CROSS-REFERENCE TO RELATED APPLICATION

This application claims the benefit of priority under 35 U.S.C. § 119 to U.S. Provisional Patent Application Ser. No. 62/905,577, entitled "TRAFFIC STEERING AND POLICY COMBINING," filed on Sep. 25, 2019, the disclosure of which application is hereby incorporated by reference in its entirety.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases, efficient management of communication resources becomes more critical. In particular, there are significant challenges in managing multiple policies that may be applicable within mobile networking environments.

BRIEF DESCRIPTION OF THE DRAWINGS

FIGS. 3A, 3B, and 3C are diagrams illustrating example details associated with combining multiple policies to generate a combined policy, according to example embodiments.

FIG. 6 is a hardware block diagram of a computing device that may perform functions for providing traffic steering and policy combining, in connection with the techniques depicted in FIGS. 1-4.

DESCRIPTION OF EXAMPLE EMBODIMENTS

Overview

Figure 1:
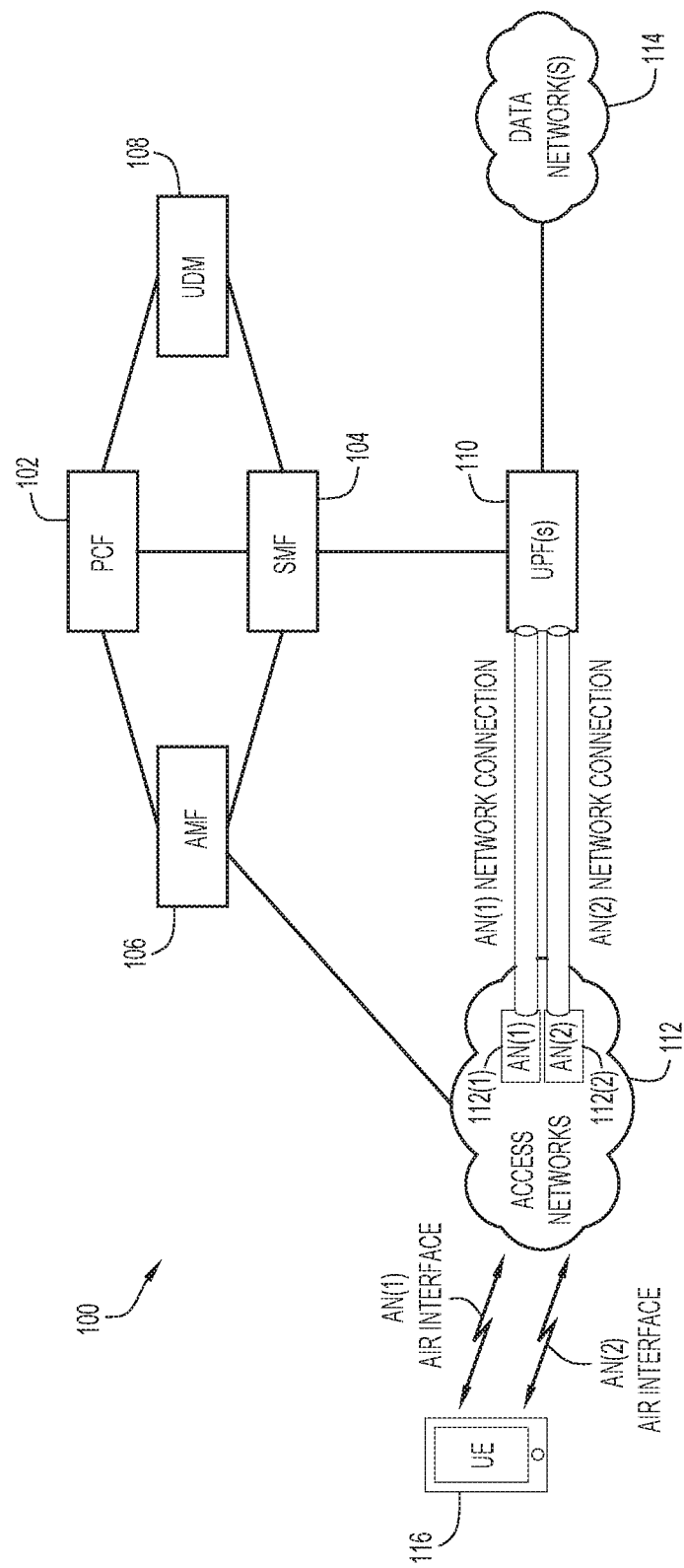
FIG. 1 is a diagram of a system in which techniques for providing traffic steering and policy combining may be implemented, according to an example embodiment.

Techniques presented herein provide enhanced Third (3rd) Generation Partnership Project (3GPP) signaling to support transport of user equipment (UE) Access Traffic Steering, Switching, and Splitting (ATSSS) rules. Additionally, techniques presented herein provide a policy combining functionality in which various policies may be combined by a policy function in order to generate a combined policy.

In an example embodiment, a method is provided that includes combining, by a policy function of a network, a user equipment (UE) access policy comprising UE access rules obtained from a UE with a network-based access policy associated with the network to generate a combined access policy, the combined access policy comprising combined access rules; communicating the combined access rules to the UE via a message, wherein the message comprises an indication that indicates that the UE is not allowed to override the combined access rules with the UE access rules; and communicating the combined access rules to a user plane function handling traffic for the UE.

EXAMPLE EMBODIMENTS

Release 16 of Third (3rd) Generation Partnership Project (3GPP) specifications have defined advanced capabilities for supporting multi-access Protocol Data Unit (PDU) sessions (also referred to generally as 'PDUs'), including the definition of Access Traffic Steering, Switching, and Splitting ATSSS rules for defining how to steer traffic across multiple interfaces (e.g., across different access networks/network paths). For example, different steering policies defined may include Active-Standby, Smallest Delay, Load-Balancing, Priority-based, etc. that may provide for steering traffic across multiple access networks/network paths.

Within a 3GPP mobile network, these policies can be signaled from a Policy Control Function (PCF) to a Session Management Function (SMF) and then to a user equipment (UE) (via an Access and Mobility Management Function (AMF)) and also from the SMF to a User Plane Function (UPF) handling traffic for the UE PDU sessions.

3GPP specifications permit these policies to be 'adapted' to local conditions, in some cases, based on user preferences and/or policies configured locally on a UE. For example, according to 3GPP Technical Specification (TS) 23.501, version 16.1.0 (2019-06), Section 5.32.1:

After the establishment of a MA PDU Session, and when there are user-plane resources on both access networks, the UE applies network-provided policy (i.e. ATSSS rules) and considers local conditions (such as network interface availability, signal loss conditions, user preferences, etc.) for deciding how to distribute the uplink traffic across the two access networks.

However, the ability to adapt policies based on user preferences can result in uplink (UL) transmission policies (e.g., for transmissions from the UE to the network) being contradictory and/or conflicting with downlink (DL) transmission policies (e.g., for transmissions from the UPF to the UE). For example, the SMF may signal to the UE an ATSSS Rule that 3GPP-based access is the priority, whereas a local UE preference may be that Wi-Fi is the priority (e.g., due to some tariffing differences). In this example, this means that the policy for the UL in the UE and the DL in the UPF effectively contradict each other, meaning the UE may incur costs of cellular when its policy tries to avoid such costs. Accordingly, what is needed is an enhancement to avoid such conflicting situations.

Presented herein are techniques to provide traffic steering and policy combining in a mobile network. In particular, embodiments herein provide a system and method to provide enhanced 3GPP signaling to support transport of UE ATSSS rules. Additionally, techniques presented herein provide a policy combining functionality in which various policies can be combined by a policy function in order to generate a combined access policy including combined access rules (e.g., ATSSS rules). The combined access policy/access rules (also referred to herein interchangeably as 'combined access policy/rules') can be signaled to the UE in a message in which at least one of the combined access policy/rules and/or the message may provide an indication that indicates that the UE is not to override the combined access policy/rules with user preference(s) and/or locally configured policies in selecting one or more access network(s) for uplink communications (e.g., for packet flows transmitted from the UE to the network). The combined access policy/rules can also be signaled to the UPF handling traffic for the UE PDU session(s) for downlink communications (e.g., packet flows) transmitted from the UPF to the UE. Generally, as referred to herein, a 'policy' can represent a collection of intent or goals, sometimes characterized as 'rules', through which application of the policy (e.g., rules of the policy) can be utilized to realize the intent or goals of the policy.

FIG. 1 is a block diagram of a system 100 in which techniques for providing traffic steering and policy combining may be implemented, according to an example embodiment. In at least one implementation, the system 100 may include a Policy Control Function (PCF) 102, a Session Management Function (SMF) 104, an Access and Mobility Management Function (AMF) 106, a Unified Data Management (UDM) 108 (having a unified data repository or UDR), one or more User Plane Function(s) (UPF(s)) 110, access networks (ANs) 112, and one or more data networks (DNs) 114. Further illustrated in system 100 is a user equipment (UE) 116.

Access networks (ANs) 112 may include any number of access networks such as a first access network AN(1) 112(1) and a second access network AN(2) 112(2). The access networks 112, which may be inclusive of Radio Access Networks (RANs), may include be configured with any combination of with radios [sometimes referred to as access points, which may include any combination of hardware (e.g., receiver(s), transmitter(s), antenna(s) and/or antenna array(s), processor(s), memory element(s), baseband processor(s) (modems), etc.), software, etc.], controllers (e.g., wireless local area network controllers, etc.), and/or any other elements/entities that may facilitate access network connections for one or more elements of system 100. Radios/access points for ANs 112 may include any combination of 4G/LTE evolved Node Bs (eNBs or eNodeBs), 5G/next generation NodeB (gNB), Wi-Fi® access points, and/or any other radio devices now known here or hereafter developed.

As illustrated in FIG. 1, PCF 102 may interface with SMF 104, AMF 106, and UDM 108. SMF 104 may further interface with AMF 106, UDM 108, and UPF(s) 110. AMF 106 may further interface with a cellular-based access network of ANs 112.

UPF(s) 110 may further interface with ANs 112 via corresponding network connections (e.g., tunnels, etc.) and with one or more data network(s) 114. UE 116 may interface with ANs 112 via over-the-air Radio Frequency (RF) connections. For example, for the embodiment of FIG. 1, UE 116 may be configured with hardware (e.g., receiver(s), transmitter(s), antenna(s) and/or antenna array(s), processor(s), memory element(s), baseband processor(s) (modems), etc.), software, and/or the like to facilitate a first over-the-air interface for accessing the first access network AN(1) 112(1) via an AN(1) air interface and a second over-the-air interface for accessing the second access network AN(2) 112(2) via an AN(2) air interface. Corresponding network connections for each AN 112, such as AN(1) network connections associated with the first access network 112(1) and AN(2) network connections associated with the second access network 112(2), may be configured to interconnect ANs 112 and UPF(s) 110. Although only one UPF is illustrated in FIG. 1, it is to be understood that the user plane of system 100 may include any number of UPFs to facilitate network connections between access networks 112 and data network(s) 114, which may be associated with different network paths between the networks 112/114. In at least one embodiment, PCF 102, SMF 104, AMF 106, UDM 108, and UPF(s) 110 may be considered a mobile core network or, more generally, a mobile network such as a 5G Core Network (5GC).

Typically, AMF 106 provides access authentication services, authorization services, and mobility management control, while SMF 104 is responsible for session management with individual functions being supported on a per session basis and also for selection and control of a UPF (e.g., UPF(s) 110) for data transfer. The UPF(s) 110 may operate as a Virtual Network Function (VNF) to provide packet routing and forwarding operations for user data traffic and may also perform a variety of functions such as packet inspection, traffic optimization, Quality of Service (QoS), billing, policy enforcement, billing operations, etc. for UE 116 PDU sessions.

Typically, UDM 108 stores subscription data for subscribers (e.g., UE 116) including, but not limited to, UE profiles and subscription-based ATSSS rules for UEs. PCF 102 typically stores policy data for system 100 including but not limited to, network operator policies, which may include operator-based ATSSS rules. During operation, for example, data from UDM 108 can be provided to PCF 102 to facilitate the application of policies to traffic flows as managed by SMF 104, which may provide UE Route Selection Policies (URSP) and ATSSS configurations/rules to UE 116 via AMF 106.

In various embodiments, UE 116 may be associated with any electronic device, machine, robot, etc. wishing to initiate a flow in system 100. The terms 'device', 'electronic device', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, an iPhone™ iPad™, a Google Droid™ phone, an Internet Protocol (IP) phone, any other device and/or combination of devices, component, element, and/or object capable of initiating voice, audio, video, media, or data exchanges within system 100. UE 116 discussed herein may also be inclusive of a suitable interface to a human user such as a microphone, a display, a keyboard, or other terminal equipment. UE 116 discussed herein may also be any device that seeks to initiate a communication on behalf of another entity or element such as a program, a database, or any other component, device, element, or object capable of initiating an exchange within system 100. It is to be understood that any number of UEs may be present in system 100.

In various embodiments, ANs 112 including first AN 112(1) and second AN 112(2) may be any combination of licensed spectrum access networks, such as 3GPP access networks (e.g., 4th Generation (4G)/Long Term Evolution (LTE), 5th Generation (5G), next Generation (nG), etc. access networks), unlicensed spectrum non-3GPP access networks (e.g., Institute of Electrical and Electronic Engineers (IEEE) 802.11 (Wi-Fi®), IEEE 802.16 (WiMAX®), Wireless Local Area Network (WLAN), etc. access networks), unlicensed spectrum 3GPP access networks (e.g., License Assisted Access (LAA), enhanced LAA (eLAA), etc. access networks), and/or the like. Although only two access networks are illustrated in system 100, it is to be understood that any number of access networks may be present in a system in accordance with embodiments of the present disclosure. In various embodiments, data network(s) 114 may be any combination of the Internet, an IP Multimedia Subsystem (IMS), enterprise network, and/or the like. In other embodiments, data network(s) 114 may be any combination of Ethernet and Ethernet switching systems, and/or the like.

Through techniques presented herein, system 100 may provide for the ability to signal a 'UE ATSSS Rule' towards the network in a Non-Access Stratum (NAS) message. The UE ATSSS rule can be carried by enhancing conventional signaling from UE 116 to AMF 106 such as, for example, including the UE ATSSS Rule in a PDU Session Establishment Request sent from UE 116 to AMF 106. The UE ATSSS Rule can then be signaled from AMF 106 to SMF 104 using conventional signaling and also appended in SMF 104 to PCF 102 messages, as discussed in further detail herein.

PCF 102 can be enhanced with a policy combining functionality which is able to take the requested UE ATSSS Rule, possible subscription-based ATSSS Rules and/or operator policies, and combine those together to generate a combined access policy including combined access rules (e.g., ATSSS rules). In at least one embodiment, the policy combining can be based on an extensible Access Control Markup Language (XACML) combining process, which can facilitate various combining algorithms or logic that be extended to account for cellular/WLAN traffic steering use cases.

The combined access policy/access rules are then signaled back to UE 116 in messaging in which at least one the combined access policy/access rules and/or the messaging provides an indication that the access policy/rules are a 'combined' access policy/rules such that the UE is not to override the combined policy/access rules in selecting an access network for transmitting UL traffic towards the network. The combined access policy/access rules are also signaled to UPF(s) 110 using conventional ATSSS signaling, as prescribed by 3GPP specifications. According, techniques provided herein ensures that the access policy/access rules are consistent between UL communications implemented in UE 116 and DL communications implemented in UPF(s) 110.

Figure 2:
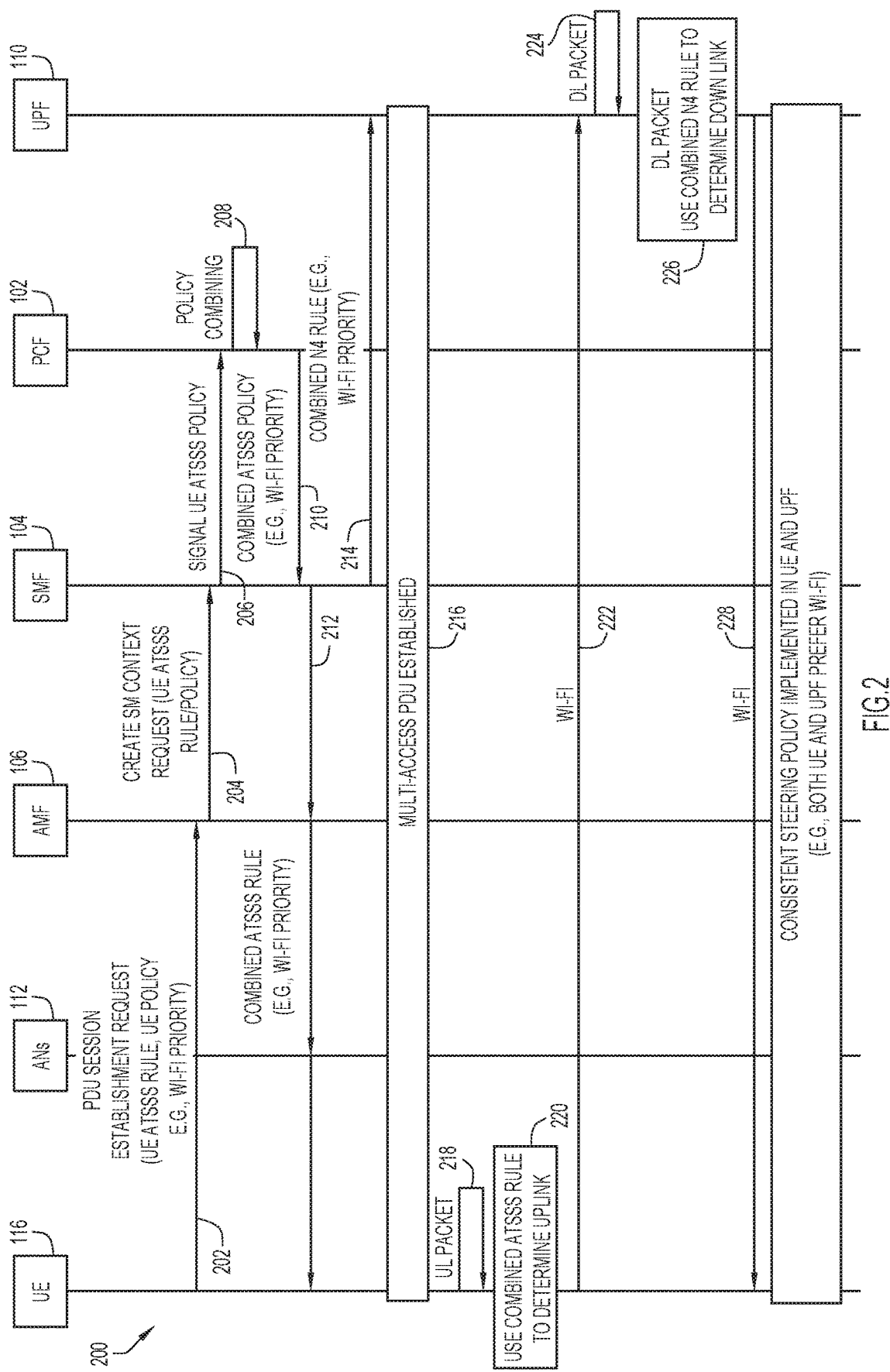
FIG. 2 is a message sequence diagram illustrating a call flow for providing traffic steering and policy combining, according to an example embodiment.

Consider an operational example, as illustrated in FIG. 2, which illustrates a message sequence diagram 200 illustrating a call flow for providing traffic steering and policy combining, according to an example embodiment. FIG. 2 includes UE 116, ANs 112, AMF 106, SMF 104, PCF 102, and a particular UPF 110. At 202, UE 116 may send a PDU Session Establishment Request to AMF 106 (via a cellular-based access network of ANs 112) that includes a local UE ATSSS rule/policy configured for UE 116. Consider for the present operational example that AN(1) 112(1) is a cellular-based access network (e.g., 5G) and that AN(2) 112(2) is a WLAN access network (e.g., Wi-Fi® wireless network). Further consider for the present operational example, that the UE ATSSS rule/policy indicates a priority for sending UL transmissions via Wi-Fi (AN(2) 112(2). In at least one embodiment the PDU Session Establishment Request can be enhanced with a new Information Element (IE) to carry the UE ATSSS rule/policy; however, other techniques for carrying the UE ATSSS rule/policy can be envisioned.

At 204, AMF 106 includes the UE ATSSS rule/policy within a Create Session Management (SM) Context Request communicated to SMF 104. At 206, SMF 104 signals the UE ATSSS policy to PCF 102. At 208, PCF 102 combines the UE ATSSS Policy with one or more network-based policies (e.g., one or more subscription policies for the UE and/or one or more operator policies, which may be obtained from UDM 108 (not shown in FIG. 2)) to generate a combined ATSSS policy that includes one or more combined ATSSS rule(s) (or more generally, a combined access policy/rule(s)). Additional features associated with policy combining are discussed herein with reference to FIGS. 3A-3C.

Returning to the present operational example, consider that the network-based policy indicates a priority for sending DL transmissions to the UE via a cellular access network. Further consider for the embodiment of FIG. 2 that the combined ATSSS policy/rule(s) includes the Wi-Fi priority for the UE 116 to send UL transmissions towards UPF 110 and also for the UPF 110 to send downlink transmissions toward UE 116. Thus, the combined ATSSS policy may override the original network-based policy provided to PCF 102.

At 210, PCF signals the combined ATSSS policy/rule(s) to SMF 104. At 212, SMF 104 communicates a message (e.g., a create session response message) to UE 116 (via AMF 106 and AN(1) 112(1)) that includes the combined ATSSS rule(s) in which at least one of the combined ATSSS rule(s) and/or the message provides an indication indicates that the UE 116 is not allowed to override the combined ATSSS rule(s) based on the local UE ATSSS policy/rule(s) configured at UE 116. In various embodiments, the indication that a UE is not allowed to override a combined access policy/rule(s) (e.g., combined ATSSS rule(s)) may be inclusive of setting a bit, a byte, a control word, a Type-Length-Value (TLV) object, an attribute value pair (AVP), a flag, combinations thereof, and/or the like using at least one of the combined access policy/rules themselves (e.g., indicating that access rule(s) are 'combined' access rule(s)) and/or the messaging to indicate that a UE is not to override the combined access rule(s). At 214, SMF 104 communicates a message to UPF 110 that includes the combined ATSSS policy/rule(s) as a combined N4 rule. At 216, a multi-access PDU session is established for UE 116 in accordance with 3GPP standards as may be understood in the art, now known here and/or hereinafter developed.

At 218, consider that UE 116 determines an uplink (UL) packet for a particular packet flow (e.g., a type of flow, a flow associated with a particular application/service, etc.) is to be transmitted to the network. For the UL transmission, UE 116 determines at 220, based on the combined ATSSS rule(s), to use Wi-Fi (AN(2) 112(2)) for the UL transmission for the particular flow, as shown at 222. For the embodiment of FIG. 2, the combined ATSSS rule(s) is/are aligned with the UE ATSSS policy/rule(s) (e.g., overrides the network-based policy); however, for embodiments in which a combined ATSSS policy/rule(s) contradicts a locally configured UE ATSSS policy/rule(s) (e.g., the combined rule(s) is/are to override the locally configured UE policy/rule(s)), the indication provided via the messaging to the UE (e.g., via the rules themselves and/or in the messaging) can be used to prevent the UE from overriding the combined ATSSS policy/rule(s) in selecting an access network for uplink transmissions.

At 224, consider that UPF 110 determines a downlink (DL) packet for the given packet flow (e.g., a type of flow, a flow associated with a particular application/service, etc.) is to be transmitted to UE 116. For the DL transmission, UPF determines at 226, based on the combined N4 rule, to use Wi-Fi (AN(2) 112(2)) for the DL transmission, as shown at 228. In at least one embodiment, determining a packet for a particular flow that is to be transmitted can include identifying the particular packet/packet flow as matching a particular combined access rule, selecting an interface (e.g., a radio configured for a communications unit of the UE 116 or a network connection configured for a communications unit UPF 110) associated with access network(s)/network connection(s) identified by the particular combined access rule, and causing one or more packets associated with the flow to be transmitted using the selected interface.

In various embodiments, identifying a particular packet/packet flow as matching a particular combined access rule may include any technique such as, for example, matching a particular combined access rule to a particular packet/packet flow using any combination of a Traffic Flow Template (TFT) (e.g., as may be prescribed at least by 3GPP TS 29.274 and TS 24.008), tuple information (e.g., source/destination address, port, etc.), an application identifier, an application instance identifier, and/or the like and selecting a corresponding interface for a corresponding access network/network connection for transmitting the packet/packet flow.

Accordingly, as illustrated for the embodiment of FIG. 2, a consistent steering policy is implemented in the UE 116 and UPF 110; for example, both UE 116 and UPF 110 prefer Wi-Fi for sending transmissions. Thus, the combined access rule aligns UE 116 access network selections for which the UE 116 is permitted to transmit uplink traffic to the network (e.g., UPF 110) with UPF 110 access network selections for which the user plane function is permitted to select for transmitting downlink traffic to the UE 116.

Figure 3A:
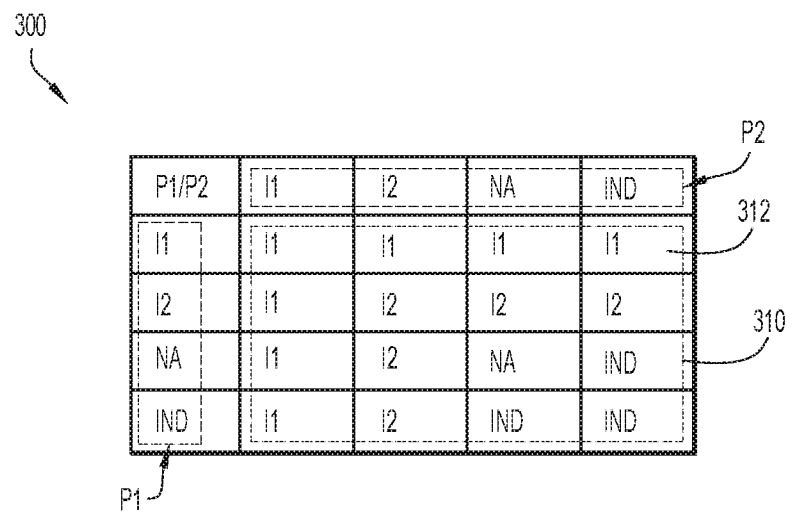

Referring to FIG. 3A, FIG. 3A is a table 300 illustrating example details associated with a combining process for combining a first access policy (P1) with a second access policy (P2) to generate a combined access policy 310 including a number of combined access rules 312, according to an example embodiment.

In general, the conventional XACML policy combining process produces binary decisions such as: Permit (P), Deny (D), Not Applicable (NA), or Indeterminate (IND), which can be applied using various combining models such as 'Permit-Overrides', 'Deny-Overrides', 'Deny-Unless-Permit', as are generally understood in the art.

In at least one embodiment, conventional XACML policy combining processes can be applied to access resources such that binary decisions of either preferring a first interface (I1) associated with a first access network (e.g., cellular) or preferring a second interface (I2) associated with a second access network (e.g., Wi-Fi, or vice-versa) can be used to generate a combined access policy/rules. For such binary combining processes, any conflict resulting from combining a first policy (P1) with a second policy (P2) may result in returning an IND outcome.

Referring to FIG. 3A, each policy P1 and P2 may include rules indicating preferences associated sending packets over a first interface (I1) (e.g., cellular) or a second interface (I2) (e.g., Wi-Fi, or vice-versa). For the embodiment of FIG. 3A, table 300 illustrates example combined access policy 310 including a number of combined access rules 312 (cells of the table) in which conventional XACML can be applied to a multi-path 'Interface1-Overides' policy/rule combining algorithm or logic for a combining process in order to generate the combined access policy 310. One or more combined access rules 312 of the combined access policy 310 may be communicated to a UE/UPF to be utilized for access network selection for one or more packet flows to be communicated between the UE/UPF.

Although generating combined access policies/rules utilizing a combining algorithm in which a preference for one interface over another may be useful for aligning UL and DL transmissions to a same interface, in some embodiments, a binary decision may be insufficient for selection of access resources. 3GPP networking environments involving Access Network Discovery and Selection Function (ANDSF) operations are typically limited to a binary type access network decision in which only one access network may be selected for a type of flow. However, in some instances, non-binary or 'fuzzy' decisions may be advantageous in order to enable a combination of access networks to be utilized for one or more types of flows.

Accordingly, in some embodiments provided herein more than one access network may be identified for combined access policy/access rules that may be generated in which a combination of access networks can be utilized for transmissions. For example, in some instances a combined access rule may provide for the ability to send packets over both a first interface (I1) (e.g., Wi-Fi) and a second interface (I2) (e.g., cellular or vice-versa). In still some instances, a combined access rule may provide for the ability to send packets over either the first interface (I1) or the second interface (I2).

Thus, conventional XACML policy combining processes can be enhanced or extended to facilitate preference-based access policy combining processes that may be used to generate a combined access policy that permits more than one access network to be utilized by a UE (e.g., UE 116) for transmitting uplink traffic to the network and more than one access network to be utilized by a UPF (e.g., UPF 110) for transmitting downlink traffic to the UE.

For the preference-based policy combining process, consider that a symbol '∧' represents represent an 'and' combination while a symbol '∨' represents an 'or' combination such that 'I1∧I2' can represent a decision or preference to send transmissions over both I1 and I2 while 'I1∨I2' can represent a decision or preference to send transmissions over either I1 or I2.

Referring to FIG. 3B, FIG. 3B is a table 350 illustrating example details associated with a combining process for combining a first access policy (P1) with a second access policy (P2) to generate a combined access policy 360 including a number of combined access rules 362 (cells of the table), according to an example embodiment.

Table 350 illustrates example details associated with generating combined access policy 360 in which a preference-based combining algorithm may be utilized for a combining process to generate a combined access policy including various combined access rules 362. In particular, table 350 illustrates example combined access policy 360 that may result from a 'weak consensus' preference-based policy/rule combining algorithm for combining the first access policy P1 (first vertical column) with the second access policy P2 (first horizontal row). For the 'weak consensus' preference-based policy/rule combining, sub-policies or rules should not conflict with each other such that a request is permitted if some sub-policies/rules permit a request and no sub-policy/rule denies it. Further, a request is denied if some sub-policies/rules deny a request and no sub-policy/rule permits it. Additionally, a value indicating conflict (CF) is yielded if some permit and some deny.

Referring to FIG. 3C, FIG. 3C is a table 350' illustrating example details associated with a combining process that may include combining a first access policy (P1) with a second access policy (P2) to generate a combined access policy 360' including a number of combined access rules 362' (cells of the table), according to an example embodiment. Each access policy may have access rules including preferences associated with a first interface (I1) (e.g., cellular) and a second interface (I2) (e.g., Wi-Fi, or vice-versa). In particular, table 350' illustrates example combined access policy 360' that may result from an 'Interface2-overides' preference-based policy/rule combining algorithm for combining the first access policy P1 (first vertical column) with the second access policy P2 (first horizontal row).

The example policy combinations illustrated in FIGS. 3A-3C are only a few of the many access policy combinations that may be generated using techniques presented herein and are not meant to limit the broad scope of the present disclosure. Virtually any other access policy combinations can be envisioned and, thus, are clearly within the scope of the present disclosure.

Figure 4:
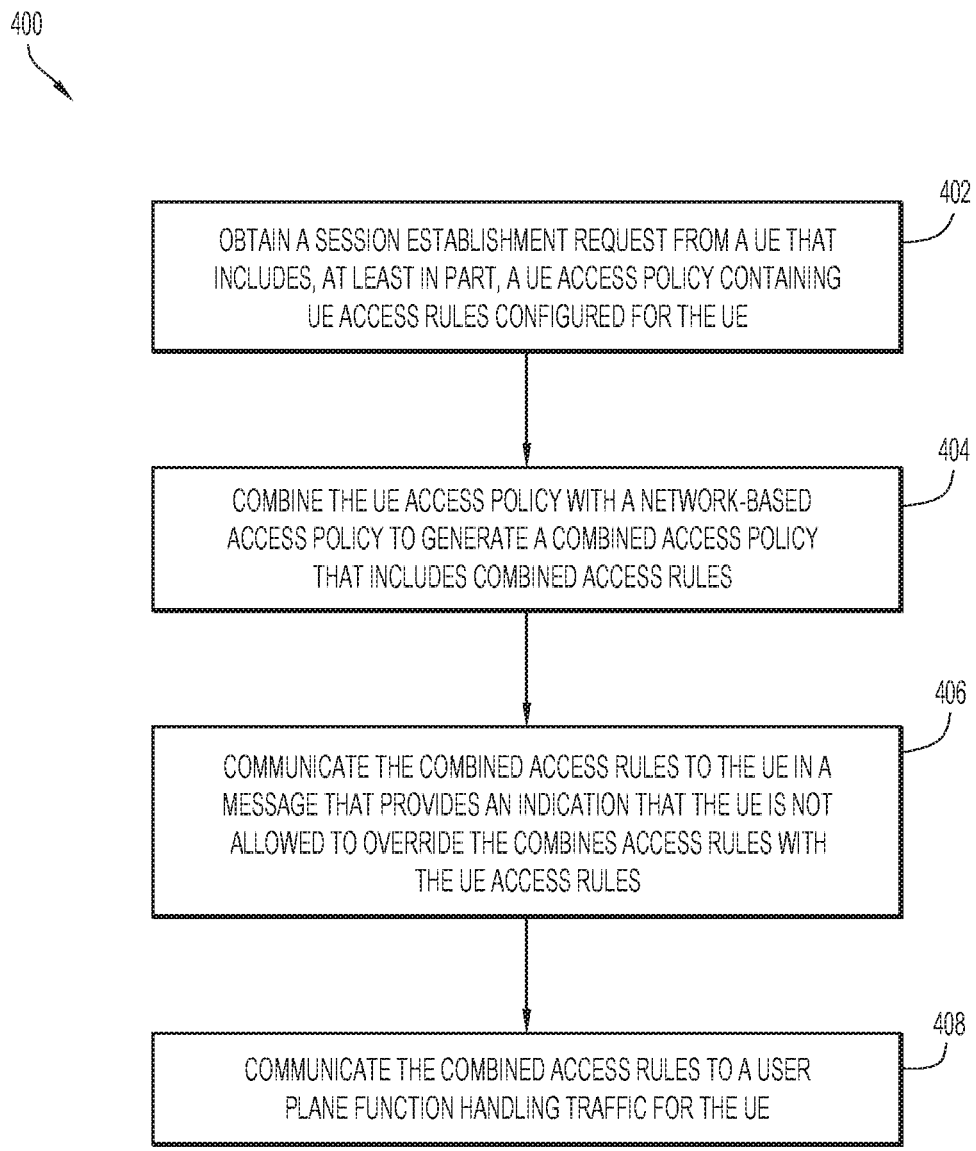
FIG. 4 is a flow chart depicting a method according to an example embodiment.

Referring to FIG. 4, FIG. 4 is a flow chart depicting a method 400 according to an example embodiment. In particular, method 400 illustrates example operations that may be performed by a policy function (e.g., PCF 102) to provide access steering and policy combining features as discussed for techniques presented herein.

At 402, the method may include the policy function obtaining a session establishment request from a UE (e.g., UE 116) for a multi-access PDU session for the UE in which the session establishment request includes, at least in part, a UE access policy containing UE access rules configured for the UE. At 404, the policy function combines the UE access policy with a network-based access policy to generate a combined access policy that includes combined access rules. In at least one embodiment, the combining can be performed using a preference-based combining process that permits more than one access network to be utilized by the UE for transmitting uplink traffic to the network and more than one access network to be utilized by a UPF (e.g., UPF 110) for transmitting downlink traffic to the UE.

At 406, the policy function communicates the combined access rules (e.g., combined access policy/rules) to the UE (via an SMF/AMF/AN) using a message that provides an indication (e.g., via combined access rules and/or the message) that indicates that the UE is not allowed to override the combined access rules (e.g., combined access policy/rules) with the UE access rules configured at the UE. At 408, the policy function communicates the combined access rules (e.g., combined access policy/rules) to a UPF (e.g., UPF 110) handling traffic for the UE.

Figure 5:
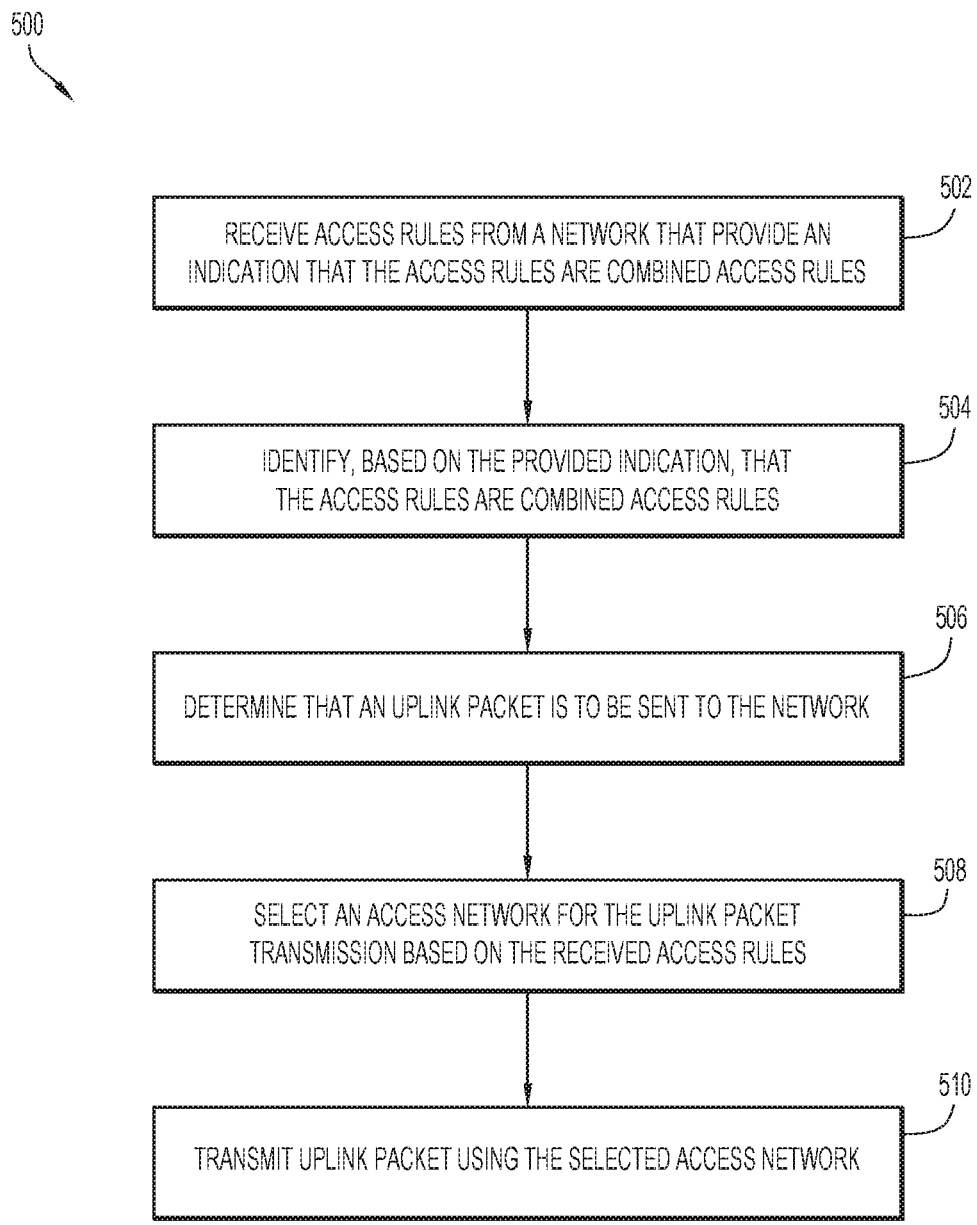
FIG. 5 is another flow chart depicting another method according to an example embodiment.

Referring to FIG. 5, FIG. 5 is another flow chart depicting another method 500 according to an example embodiment. In particular, method 500 illustrates example operations that may be performed by a user equipment (e.g., UE 116) to perform access network selection for transmitting one or more uplink packets to a network (e.g., to ANs 112 for further transmission toward UPF 110).

At 502, the UE receives access rules from the network (e.g., via a PCF/SMF/AMF/AN communication) in which the access rules provide an indication (e.g., via the access rules and/or messaging that includes the access rules) that the access rules are combined access rules. At 504, the UE identifies, based on the provided indication, that the access rules are combined access rules, which indicates to the UE that the UE is not allowed to override the access rules with locally configured rules when selecting an access network for performing uplink transmissions.

At 506, the UE determines that it has at least one uplink packet that is to be sent to the network. At 508, the UE selects an access network for the uplink packet transmission based on the received access rules and, at 510, the UE transmits the uplink packet to the network using the selected access network.

In summary, techniques presented herein provide enhanced 3GPP signaling to support transport of UE ATSSS rules. Additionally, techniques presented herein provide a policy combining functionality in which various policies may be combined by a policy function in order to generate a combined policy. Accordingly, techniques provide for the ability to facilitate traffic steering and policy combining in a mobile network Referring to FIG. 6, FIG. 6 illustrates a hardware block diagram of a computing device 600 that may perform the functions of a policy function (e.g., PCF 102), referred to herein in connection with FIGS. 1-4. It should be appreciated that FIG. 6 provides only an illustration of one embodiment and does not imply any limitations with regard to the environments in which different embodiments may be implemented. Many modifications to the depicted environment may be made.

As depicted, the computing device 600 includes a bus 612, which provides communications between computer processor(s) 614, memory 616, persistent storage 618, one or more communications units 620, and input/output (I/O) interface(s) 622. Bus 612 can be implemented with any architecture designed for passing data and/or control information between processors (such as microprocessors, communications and network processors, etc.), system memory, peripheral devices, and any other hardware components within a system. For example, bus 612 can be implemented with one or more buses.

Memory 616 and persistent storage 618 are computer readable storage media, which can be inclusive on non-transitory computer readable storage media. In the depicted embodiment, memory 616, which may be inclusive of one or more memory element(s), includes random access memory (RAM) 624 and cache memory 626. In general, memory 616 can include any suitable volatile or non-volatile computer readable storage media. Instructions for control logic 640 may be stored in memory 616 and/or persistent storage 618 for execution by processor(s) 614. When the processor(s) 614 execute control logic 640, the processor(s) 614 are caused to perform the operations described above in connection with FIGS. 1-4 such as, for example, obtaining a UE access policy comprising UE access rules and a network-based access policy, combining one or more access policies/rule(s) utilizing a combining algorithm or logic via a combining process to generate a combined access policy/rule(s), communicating combined access policy/rule(s) to the UE and a UPF in which the combined access policy/rule(s) communicated to the UE include an indication that indicates that the UE is not allowed to override the combined access policy/rule(s) with the UE access rules, and/or any other operations as discussed for embodiments described herein.

One or more programs and/or other logic may be stored in persistent storage 618 for execution by one or more of the respective computer processors 614 via one or more memory element(s) of memory 616. The persistent storage 618 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 618 may also be removable. For example, a removable hard drive may be used for persistent storage 618. Other examples include optical and magnetic disks, thumb drives, and smart cards that are inserted into a drive for transfer onto another computer readable storage medium that is also part of persistent storage 618.

Communications units 620, in these examples, provides for communications with other data processing systems, networks, and/or devices. In these examples, each communications unit 620 may include at least one interface (IF) 621, which may facilitate communications with systems, networks, and/or devices utilizing any combination of cellular hardware, software, etc. (e.g., 4G radios, 5G radios, etc. as discussed herein), Wi-Fi hardware, software, etc. (e.g., Wi-Fi radios, etc. as discussed herein), wired hardware, software, etc. (e.g., network interface cards, etc.) to facilitate one or more connections for communications discussed herein. Accordingly, communications units 620 may provide communications through the use of any combination of physical and/or wireless communications links.

I/O interface(s) 622, which may be inclusive of one or more network interface cards (NICs), allows for input and output of data with other devices that may be connected to computing device 600. For example, I/O interface 622 may provide a connection to external devices 628 such as a keyboard, keypad, a touch screen, and/or some other suitable input device. External devices 628 can also include portable computer readable storage media such as database systems, thumb drives, portable optical or magnetic disks, and memory cards.

Software and data used to practice embodiments can be stored on such portable computer readable storage media and can be loaded onto persistent storage 618 via I/O interface(s) 622. I/O interface(s) 622 may also connect to a display 630. Display 630 provides a mechanism to display data to a user and may be, for example, a computer monitor.

In at least one embodiment, a user equipment (e.g., UE 116) may be configured with appropriate hardware, software, and/or the like (e.g., processor(s), memory element(s), etc.) similar to that as described for computing device 600 in combination with any other hardware, software, and/or the like (e.g., RF receivers, RF transmitters, RF transceivers, antennas and/or antenna arrays, baseband processors (modems), etc.) in order to perform operations as described herein for the user equipment.

In one form, a computer-implemented method is provided that may include combining, by a policy function of a network, a user equipment (UE) access policy comprising UE access rules obtained from a UE with a network-based access policy associated with the network to generate a combined access policy, the combined access policy comprising combined access rules; communicating the combined access rules to the UE via a message, wherein the message comprises an indication that indicates that the UE is not allowed to override the combined access rules with the UE access rules; and communicating the combined access rules to a user plane function handling traffic for the UE. The combined access rules may identify access networks through which the UE is permitted to transmit uplink traffic to the network and through which the user plane function is permitted to transmit downlink traffic to the UE. Thus, the combined access rules may align UE access network selections for which the UE is permitted to transmit uplink traffic to the network with user plane function access network selections for which the user plane function is permitted to select for transmitting downlink traffic to the UE.

The method may further include obtaining, by the policy function, a session establishment request from the UE for a multi-access session for the UE, wherein the session establishment request comprises the UE access policy. The network-based access policy may include network-based access rules associated with at least one of: one or more subscription policies for the UE; and one or more operator policies. In at least one instance, the combined access rules may be Third Generation Partnership Project (3GPP) Access Traffic Steering, Switching, and Splitting (ATSSS) rules.

In some implementations, the combined access rules may override at least one of: the UE access policy; and the network-based policy. In various implementations, the access networks may include two or more of: a non-Third Generation Partnership Project unlicensed spectrum access network; a Third Generation Partnership Project unlicensed spectrum access network; and a Third Generation Partnership Project licensed spectrum access network.

In at least one implementation, the combining may performed using a preference-based combining process that permits more than one access network to be utilized by the UE for transmitting uplink traffic to the network and more than one access network to be utilized by the user plane function for transmitting downlink traffic to the UE. In at least one implementation, the policy function may be a Policy Control Function (PCF) for a Third Generation Partnership Project network. In various embodiments, the indication that the UE is not is not allowed to override the combined access rules with the UE access rules can be included in at least one of the combined access rules and/or the message.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WLAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information (e.g., data relating to contact center interaction routing). The database system may be implemented by any number of any conventional or other databases, data stores or storage structures (e.g., files, databases, data structures, data or other repositories, etc.) to store information (e.g., data relating to contact center interaction routing). A database system may be included within or coupled to a server and/or client systems. The database systems and/or storage structures may be remote from or local to the computer or other processing systems, and may store any desired data (e.g., resource record data).

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart and block diagrams in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   combining, by a policy function of a network, a user equipment (UE) access policy comprising UE access rules obtained from a UE with a network-based access policy associated with the network to generate a combined access policy, wherein the combining is performed using a preference-based combining process that permits the UE to utilize more than one access network for transmitting uplink traffic for a particular packet flow to the network and permits a user plane function to utilize more than one access network for transmitting downlink traffic for the particular packet flow to the UE, and wherein the combined access policy comprises combined access rules, wherein the combined access rules are Third Generation Partnership Project (3GPP) Access Traffic Steering, Switching, and Splitting (ATSSS) rules;
   communicating the combined access rules to the UE via a message, wherein the message communicated to the UE comprises an indication that indicates that the UE is not allowed to override the combined access rules with the UE access rules; and communicating the combined access rules to a user plane function handling traffic for the UE, wherein the combined access rules align UE access network selections for which the UE is permitted to transmit the uplink traffic to the network with user plane function access network selections for which the user plane function is permitted to select for transmitting the downlink traffic to the UE.

2. The method of claim 1, further comprising:
obtaining, by the policy function, a session establishment request from the UE for a multi-access session for the UE, wherein the session establishment request comprises an information element (IE) including the UE access policy.

3. The method of claim 1, wherein the network-based access policy comprises network-based access rules associated with at least one of:
one or more subscription policies for the UE; and
one or more operator policies.

4. The method of claim 1, wherein the combined access rules override at least one of:
the UE access policy; and
the network-based access policy.

5. The method of claim 1, wherein access networks for the access network selections comprise two or more of:
a non-Third Generation Partnership Project unlicensed spectrum access network;
a Third Generation Partnership Project unlicensed spectrum access network; and
a Third Generation Partnership Project licensed spectrum access network.

6. The method of claim 1, wherein the policy function is a Policy Control Function (PCF) for a Third Generation Partnership Project network.

7. The method of claim 1, wherein at least one combined access rule of the combined access policy identifies that the UE is permitted to transmit uplink traffic to the network via one of a first access network or a second access network.

8. The method of claim 1, wherein at least one combined access rule of the combined access policy identifies that the UE is permitted to transmit uplink traffic to the network via both of a first access network and a second access network.

9. The method of claim 1, wherein the particular packet flow is associated with an application operating on the UE.

10. The method of claim 9, wherein the particular packet flow is associated with a particular combined access rule of the combined access rules.

11. One or more non-transitory computer readable storage media encoded with instructions that, when executed by a processor, cause the processor to perform operations, comprising:
combining, by a policy function of a network, a user equipment (UE) access policy comprising UE access rules obtained from a UE with a network-based access policy associated with the network to generate a combined access policy, wherein the combining is performed using a preference-based combining process that permits the UE to utilize more than one access network for transmitting uplink traffic for a particular packet flow to the network and permits a user plane function to utilize more than one access network for transmitting downlink traffic for the particular packet flow to the UE, and wherein the combined access policy comprises combined access rules, wherein the combined access rules are Third Generation Partnership Project (3GPP) Access Traffic Steering, Switching, and Splitting (ATSSS) rules;

communicating the combined access rules to the UE via a message, wherein the message communicated to the UE comprises an indication that indicates that the UE is not allowed to override the combined access rules with the UE access rules; and communicating the combined access rules to a user plane function handling traffic for the UE, wherein the combined access rules align UE access network selections for which the UE is permitted to transmit the uplink traffic to the network with user plane function access network selections for which the user plane function is permitted to select for transmitting the downlink traffic to the UE.

12. The media of claim 11, further encoded with instructions that, when executed by the processor, cause the processor to perform further operations, comprising:
obtaining, by the policy function, a session establishment request from the UE for a multi-access session for the UE, wherein the session establishment request comprises an information element (IE) including the UE access policy.

13. The media of claim 11, wherein at least one combined access rule of the combined access policy identifies that the UE is permitted to transmit uplink traffic to the network via one of a first access network or a second access network.

14. The media of claim 11, wherein at least one combined access rule of the combined access policy identifies that the UE is permitted to transmit uplink traffic to the network via both of a first access network and a second access network.

15. The media of claim 11, wherein the policy function is a Policy Control Function (PCF) for a 3GPP network.

16. An apparatus comprising:
at least one memory element for storing data; and
at least one processor for executing instructions associated with the data, wherein executing the instructions causes the apparatus to perform operations, comprising:
combining, by the apparatus, a user equipment (UE) access policy comprising UE access rules obtained from a UE with a network-based access policy associated with the network to generate a combined access policy, wherein the combining is performed using a preference-based combining process that permits the UE to utilize more than one access network for transmitting uplink traffic for a particular packet flow to the network and permits a user plane function to utilize more than one access network for transmitting downlink traffic for the particular packet flow to the UE, and wherein the combined access policy comprises combined access rules, wherein the combined access rules are Third Generation Partnership Project (3GPP) Access Traffic Steering, Switching, and Splitting (ATSSS) rules;
communicating the combined access rules to the UE via a message, wherein the message communicated to the UE comprises an indication that indicates that the UE is not allowed to override the combined access rules with the UE access rules; and
communicating the combined access rules to a user plane function handling traffic for the UE, wherein the combined access rules align UE access network selections for which the UE is permitted to transmit the uplink traffic to the network with user plane function access network selections for which the user plane function is permitted to select for transmitting the downlink traffic to the UE.

17. The apparatus of claim 16, wherein executing the instructions causes the apparatus to perform further operations, comprising:
   obtaining, by the apparatus, a session establishment request from the UE for a multi-access session for the UE, wherein the session establishment request comprises an information element (IE) including the UE access policy.

18. The apparatus of claim 16, wherein the apparatus is a Policy Control Function (PCF) for a 3GPP network.

19. The apparatus of claim 16, wherein at least one combined access rule of the combined access policy identifies that the UE is permitted to transmit uplink traffic to the network via one of a first access network or a second access network.

20. The apparatus of claim 16, wherein at least one combined access rule of the combined access policy identifies that the UE is permitted to transmit uplink traffic to the network via both of a first access network and a second access network.

* * * * *